(12) United States Patent
Pattavina (10) Patent No.: US 6,816,475 B1
(45) Date of Patent: Nov. 9, 2004

(54) SYSTEM AND METHOD FOR DYNAMIC BANDWIDTH ALLOCATION FOR T1 OR E1 TRUNKS

(75) Inventor: Jeffrey Sebastian Pattavina, Middletown, CT (US)

(73) Assignee: Harris Corporation, Melbourne, FL (US)

( * ) Notice: Subject to any disclaimer, the term of this patent is extended or adjusted under 35 U.S.C. 154(b) by 314 days.

(21) Appl. No.: 09/964,414

(22) Filed: Sep. 28, 2001

(51) Int. Cl.[7] ............................... H04Q 7/28; H04J 3/16
(52) U.S. Cl. ...................... 370/336; 370/433; 370/442; 370/468; 370/341
(58) Field of Search ................................ 370/340, 341, 370/329, 336–337, 345, 347, 348, 433–434, 435, 442, 458, 459, 462, 468

(56) References Cited

U.S. PATENT DOCUMENTS

| | | | | | |
|---|---|---|---|---|---|
| 3,811,014 A | * | 5/1974 | Seitz | ............................ | 370/472 |
| 5,241,537 A | * | 8/1993 | Gulliford et al. | ............ | 370/341 |
| 5,535,207 A | * | 7/1996 | Dupont | ........................ | 370/433 |
| 5,912,894 A | * | 6/1999 | Duault et al. | ................ | 370/433 |
| 6,052,365 A | * | 4/2000 | Bhagalia et al. | ............. | 370/336 |
| 6,256,606 B1 | * | 7/2001 | Thyssen et al. | ............. | 704/221 |
| 6,359,927 B1 | * | 3/2002 | Hong | ..................... | 375/240.02 |
| 6,707,826 B1 | * | 3/2004 | Gorday et al. | .............. | 370/468 |

* cited by examiner

Primary Examiner—Min Jung
(74) Attorney, Agent, or Firm—Duane Morris LLP (57) ABSTRACT

The invention herein is described relates to a system and method for efficiently using bandwidth across a fixed wireless or wired interface, which may be a broadband wireless access interface. A preferred embodiment of the invention dynamically assigns bandwidth for one or more DS0 voice channels across a wireless interface in a configurable multichannel communication system using T1 and/or E1 trunks or any other multiplex source. Bandwidth for voice channels is assigned as a function of the ACTIVE/IDLE bits associated with the DS0 channels and only those voice channels that are ACTIVE are assigned bandwidth. The invention describes a system and method for the dynamic allocation or removal of bandwidth for a channel as the state of the channel changes between ACTIVE and IDLE. Channels carrying data only are not impacted by the present invention. In another embodiment, the invention assigns bandwidth across a wired interface in a multi-channel communication system.

35 Claims, 7 Drawing Sheets

SYSTEM AND METHOD FOR DYNAMIC BANDWIDTH ALLOCATION FOR T1 OR E1 TRUNKS

BACKGROUND OF THE INVENTION

The present invention relates generally to a system and method for efficiently using bandwidth across a fixed interface. The invention provides a system and method for monitoring one or more attributes of communication traffic on one or more channels operating across the interface and assigning or removing bandwidth from the one or more channels based on the monitored attributes. A preferred embodiment of the invention dynamically assigns bandwidth for one or more DS0 voice channels across a fixed interface in a configurable multi-channel communication system using T1 and/or E1 trunks. It shall be understood that the term T1/E1 as used herein shall refer to any multiplex source and not just a T1 or E1 source. Bandwidth for voice channels is assigned as a function of the ACTIVE/IDLE bits associated with the DS0 channels and only those voice channels that are active are assigned bandwidth. Channels carrying data only are not impacted by the present invention.

Typical multi-channel communication systems use a channelized T1 or E1 trunk line comprising a number of DS0 channels where each DS0 channel carries data at a rate of 64,000 bits per second, or 64 Kbps. A typical T1 line is composed of 24 DS0 channels carrying a total of 1.536 Mbps of available bandwidth for carrying communication data, plus 0.008 Mbps of framing bits which are typically unavailable to carry communication data, for a total of 1.544 Mbps throughput. A typical E1 channel is composed of 30 DS0 channels plus 2 control channels for a total throughput of 2.048 Mbps. Some E1 channels are composed of 31 DS0 channels and 1 control channel. The channelized nature of such T1/E1 systems ensures that any given channel is assigned bandwidth for use only by that channel and therefore bandwidth is always available for the exclusive use of the subscriber on that channel. While this manner of dedicating bandwidth to channels ensures availability of bandwidth for each subscriber using the system, it also introduces inefficiencies in the system during times when less than all the channels are actively being used to transmit communication information.

As an example of the inefficiencies introduced into a communication system by dedicating bandwidth to specific channels, if a T1 trunk line comprising 24 DS0 channels is operating with 12 of the channels idle, i.e., not actively passing a subscriber's communication information across 12 of the channels, approximately only half of the available bandwidth would be utilized by the communication system. The remainder of the available bandwidth would go to waste. This is particularly a problem in systems which have a wireless interface, such as a broadband wireless access system, since wireless spectrum is a valuable, expensive, and scarce resource. However, the problem is similar in wired systems where an interface between communication systems operates as a choke point due to a limitation in available bandwidth across the interface.

A typical scenario exemplifying the problem of wasting bandwidth on idle channels includes systems where voice channels are used intermittently by subscribers. When a voice subscriber goes off-hook, thereby placing the channel in an active state, the channel is used to carry voice information between the subscriber's calling party and called party. Once the call terminates, typically by the parties going on-hook, the channel is no longer actively passing subscriber communication information. If the bandwidth assigned to the channel remains dedicated to that channel, the bandwidth is wasted until such time as the subscriber re-initiates a call by going off-hook.

One of the problems faced by typical prior art communication systems is a lack of available bandwidth to satisfy the demands of the subscribers on the system. Prior art communication systems tend to overcome the lack of bandwidth by adding more channels, perhaps even adding one or more T1/E1 lines to match the subscribers bandwidth needs. However, this type of brute force solution merely aggravates the inefficiencies of the system and results in even more bandwidth going to waste.

One way to overcome the inefficiency described above is to dynamically allocate available bandwidth for voice subscribers only to those voice subscriber channels that are active at any one time, as is done by the present invention. There are a number of advantages to be realized by implementing a communication system that does not reserve dedicated bandwidth to a particular subscriber. One advantage is that since voice subscribers typically do not use a channel one hundred percent of the time, more subscribers may be added to a particular communication system without the need to add more T1 or E1 lines. Another advantage is that the bandwidth that would otherwise be dedicated to an idle voice channel can be used to increase the bandwidth of the active voice channels.

One embodiment of the present invention avoids the problems of the prior art by dynamically assigning bandwidth to active voice channels across an interface thereby increasing the bandwidth use efficiency of the system. Another embodiment of the present invention dynamically assigns bandwidth for a digital communication channel in an N channel communication system where the communication signal being transmitted includes a protocol data unit with N activity bits, one activity bit for each channel, which indicate whether the associated channels are active or idle. The activity bits are monitored and if a change in an activity bit is detected and that change persists for a predetermined time interval, the active/idle status of the channel associated with that activity bit is changed as well as the assignment of bandwidth to that channel. For example, if a channel was in an ACTIVE state, and therefore was assigned bandwidth, the detection of a persistent change in the activity bit associated with that channel would indicate that the channel is now IDLE and bandwidth would not be assigned to the channel. Similarly, if a channel was in an IDLE state, and therefore no bandwidth is assigned to the channel, the detection of a persistent change in the activity bit associated with that channel would indicated that the channel is not ACTIVE and bandwidth would therefore be assigned to the channel.

Accordingly, it is an object of the present invention to obviate many of the above problems in the prior art and to provide a novel system and method of assigning bandwidth to one or more voice channels in a multiple-user broadband wireless access communication system in response to a predetermined value of one or more signaling bits associated with the voice channels.

It is another object of the present invention to provide a novel method of assigning bandwidth to at least one communication channel in a configurable multi-channel communication system having a wireless transmission interface including at least one remote station and a base station where the traffic in the communication channels includes at least one active/idle bit indicating the status of the channel.

It is yet another object of the present invention to provide a novel system and method for dynamically monitoring the Channel Associated Signaling Bits ("ABCD Bits") and assigning bandwidth over a wireless interface based on the value of the ABCD bits.

It is still another object of the present invention to provide a novel system and method for efficiently assigning bandwidth over a wireless transmission interface for voice channels in a multi-channel communication system.

It is a further object of the present invention to provide a novel system and method for the efficient us of channel bandwidth for one or more voice subscribers using a T1 or E1 trunk across a fixed wireless interface.

It is yet a further object of the present invention to provide a novel method of dynamically assigning bandwidth for a plurality of DS0 communication channels in a digital multi-channel communication system including receiving digital information containing a signaling byte for each of a plurality of communication channels, providing a protocol data unit capable of carrying the digital information, monitoring the information in select ones of said signaling bytes, modifying the protocol data unit as a function of the information in the select signaling bytes, and assigning bandwidth as a function of the modified protocol data unit.

It is still a further object of the present invention to provide a novel system and method for efficiently assigning bandwidth across a wireless interface including refraining from assigning bandwidth for voice channels that are in an INACTIVE state.

It is an additional object of the present invention to provide a novel system and method for dynamically assigning bandwidth for a digital communication channel in a configurable N-channel communication system in which the communication signal includes plural protocol data units each having N bi-state activity bits in predetermined positions within the protocol data unit where each of the activity bits indicates the state of one of the N communication channels.

It is yet an additional object of the present invention to provide a novel system and method for dynamically assigning bandwidth in a multi-channel communication system in which the communication signal includes plural protocol data units each having a bi-state activity bit for each channel in predetermined positions within the protocol data unit where each of the activity bits indicates the state of one of the multiple communication channels where the activity bits are monitored in successive protocol data units such that if a change in the state of one of the monitored activity bits is detected the state of the channel associated with the monitored activity bit is changed in the absence of a subsequent change in the state of the activity bit during a predetermined time interval initiated by the detection of the change of state of the monitored activity bit to thereby vary the assignment of bandwidth to the channel associated with the monitored bit.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

With reference to the drawings, like numerals represent like components throughout the several drawings.

Figure 1:
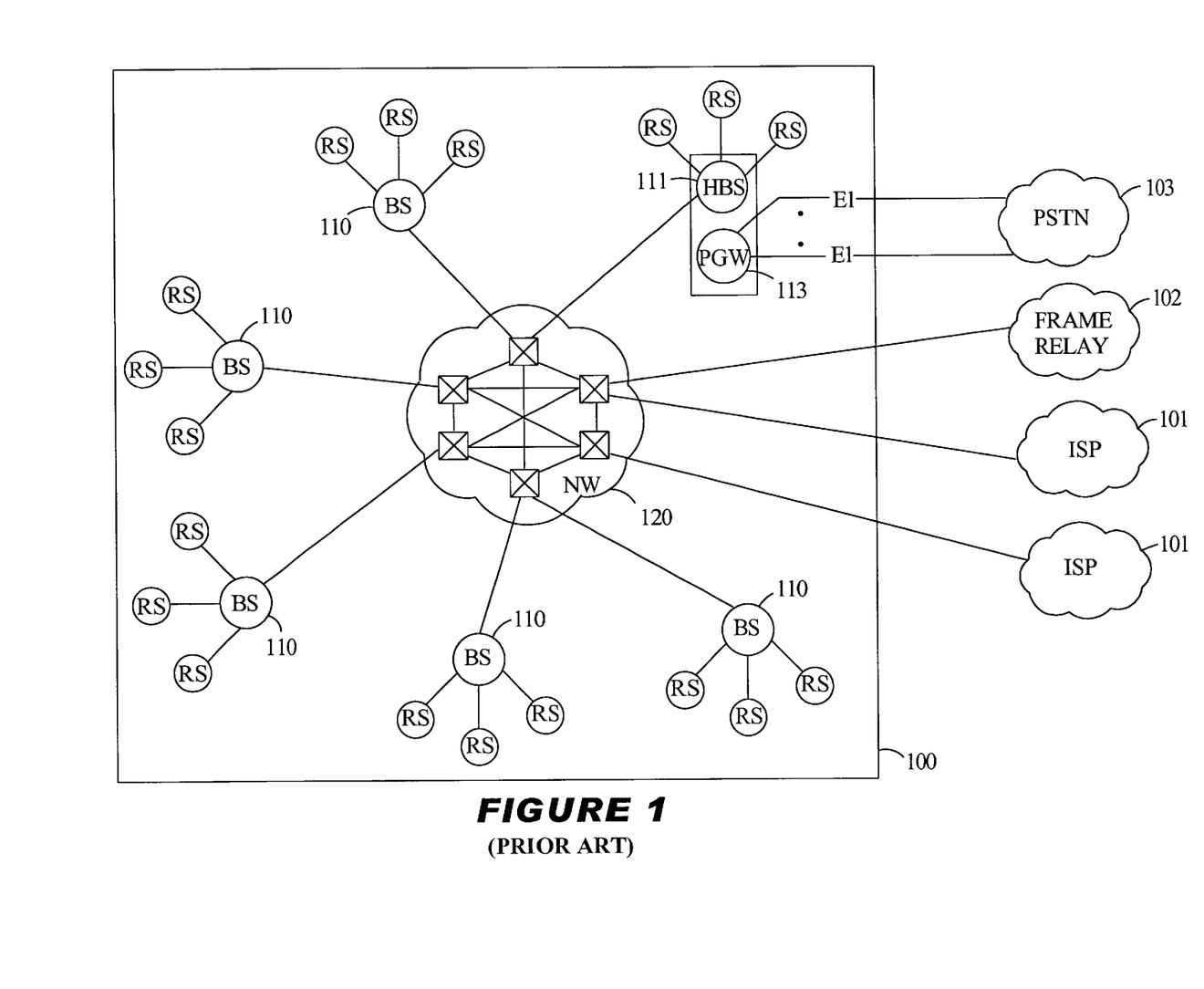
FIG. 1 is a functional schematic depiction of a typical prior art communication network including a number of remote stations ("RS") each capable of communicating with a base station ("BS"), each BS capable of communicating with a central network ("NW"), the NW capable of communicating with internet service providers ("ISP"), a frame relay site, and the public switched telephone network ("PSTN") through a PSTN Gateway ("PGW").

With reference now to FIG. 1, a typical prior art communication network 100 is depicted showing various functional connections between the various communication nodes. The communication network 100 may be a broadband wireless access network. The communication network may comprise a central network 120 configured to communicate with the various base stations 110 and the head end base station ("HBS") 111, either via a wired interface such as T1 lines, E1 lines, or optical fiber, utilizing appropriate standard protocols, or a wireless interface. The central network 120 may additionally have external connections to the internet service providers 101 and the frame relay site 102. Additionally, the central network 120 may be connected to the PSTN 103 via the PSTN Gateway 113 which may or may not be co-located with the HBS 111. The various external connections may be via any standard wired interface, such as T1 lines, E1 lines, or optical fiber. The base stations 110 and the HBS 111 may be connected to any number of remote stations 115 either through a wired or wireless interface. Although FIG. 1 depicts three remote stations per base station, it should be understood that the number of remote stations functionally connected to a base station or HBS is not of consequence to the practice of the invention described herein.

The network may be configurable such that the allocation of bandwidth to channels can be either dynamic or fixed, as discussed below.

Figure 2:
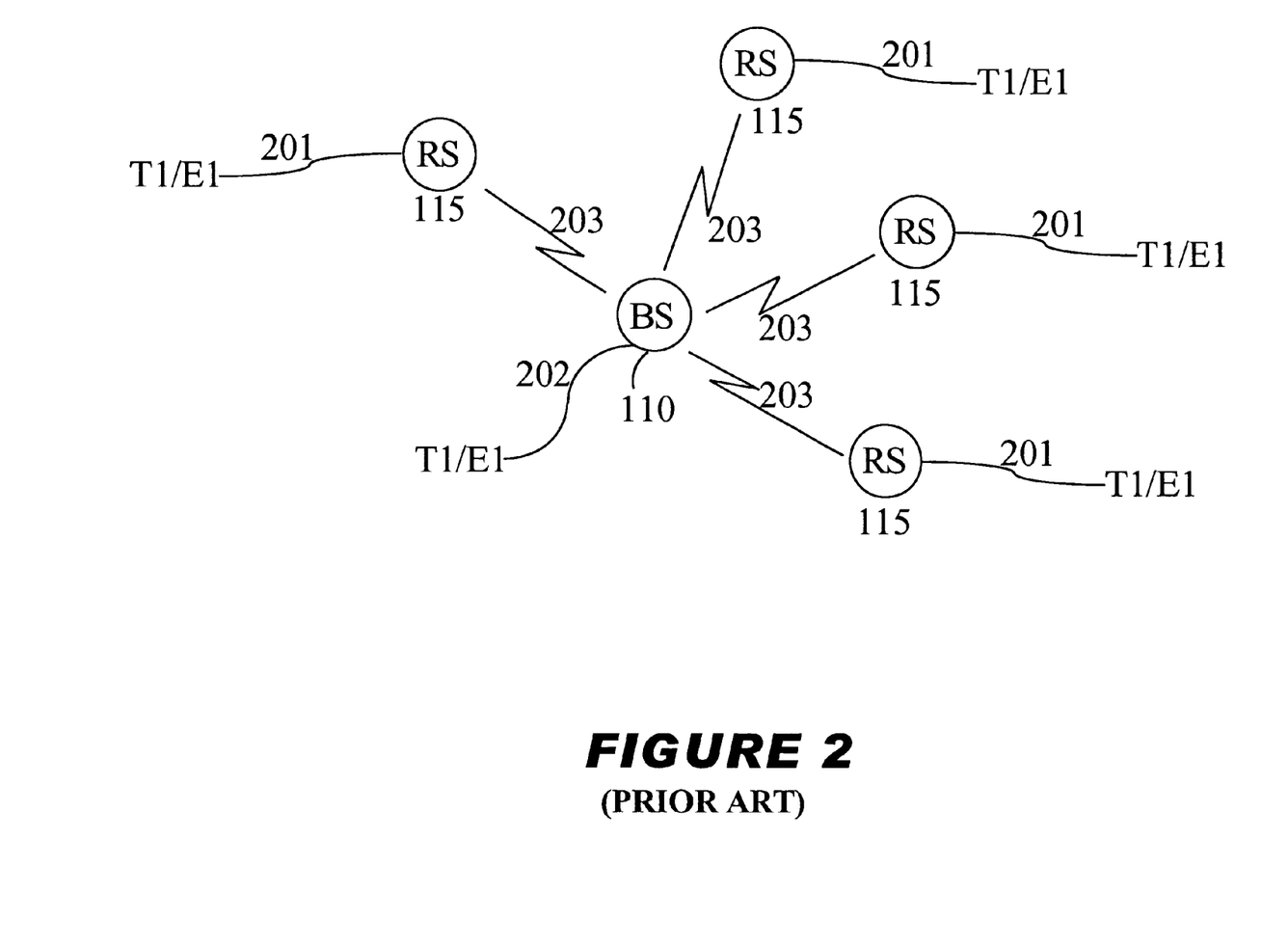
FIG. 2 is a functional schematic depiction of a portion of the prior art communication network of FIG. 1 showing a base station and remote stations in wireless communication.

With reference now to FIG. 2, which depicts a portion of the prior art communication system of FIG. 1, the base station 110 is shown in wireless communication over air links 203 with a plurality of remote stations 115. As noted above, it should be understood that the present invention is operative over a wireless or wired interface. Typically, the remote stations 115 may be connected via the T1 or E1 lines 201 to any number of, subscriber devices such as, but not limited to, private branch exchanges ("PBX"), data terminal equipment, routers, modems, multiplexers, or other networks. Similarly, the base station 110 may be connected via the T1/E1 lines 202 to the central network (not shown) or via a wireless interface. Although only one T1/E1 line is shown from the base station and remote stations, it should be understood that more than one T1/E1 line may be connected to each station. It is to be understood that subscribers may be connected to the remote stations and/or base station via cables of types other than T1/E1, such as plain old telephone system ("POTS") cables.

Generally, in the operation of the base station/remote station subsystem shown in FIG. 2. digital communication bits, which may include voice or data information, formatted in a known frame format for transmission over a T1/E1 line 202 containing a plurality of channels, are received at the base station 110 or a remote station 115. The received data is formatted such that certain bits or bytes of information in a known location of the data frame indicate whether the associated voice channels are active or idle. These bits are generally referred to as "activity bits" and there is typically one activity bit per channel. An activity bit set to a value of "1" (one) may indicate that the voice channel associated with that activity bit is ACTIVE while an activity bit set to a value of "0" (zero) may indicate that the voice channel associated with that activity bit is IDLE. Each of the activity bits or bytes for each voice channel are monitored either every frame, periodically, or at random intervals so as to determine the number of active voice channels to be assigned bandwidth. It is to be understood that the above-described procedure operates for any channel that requires signaling and is not limited to voice channels. Hereinafter, the term voice channel shall mean any channel that requires signaling.

The following discussion relates to communication traffic sent via a T1/E1 cable 201 from a subscriber and received at a remote station 115 and then transmitted from the remote station to the base station 110 over an air link 203, all as shown in FIG. 2. It shall be understood that the present invention contemplates two-way communications and the following discussion also holds for communication in the opposite direction, i.e., via a T1/E1 cable 201 to the base station 110 over an air link 203 to a remote station 115 to a subscriber via a T1/E1 cable 201 except where indicated.

Figure 3:
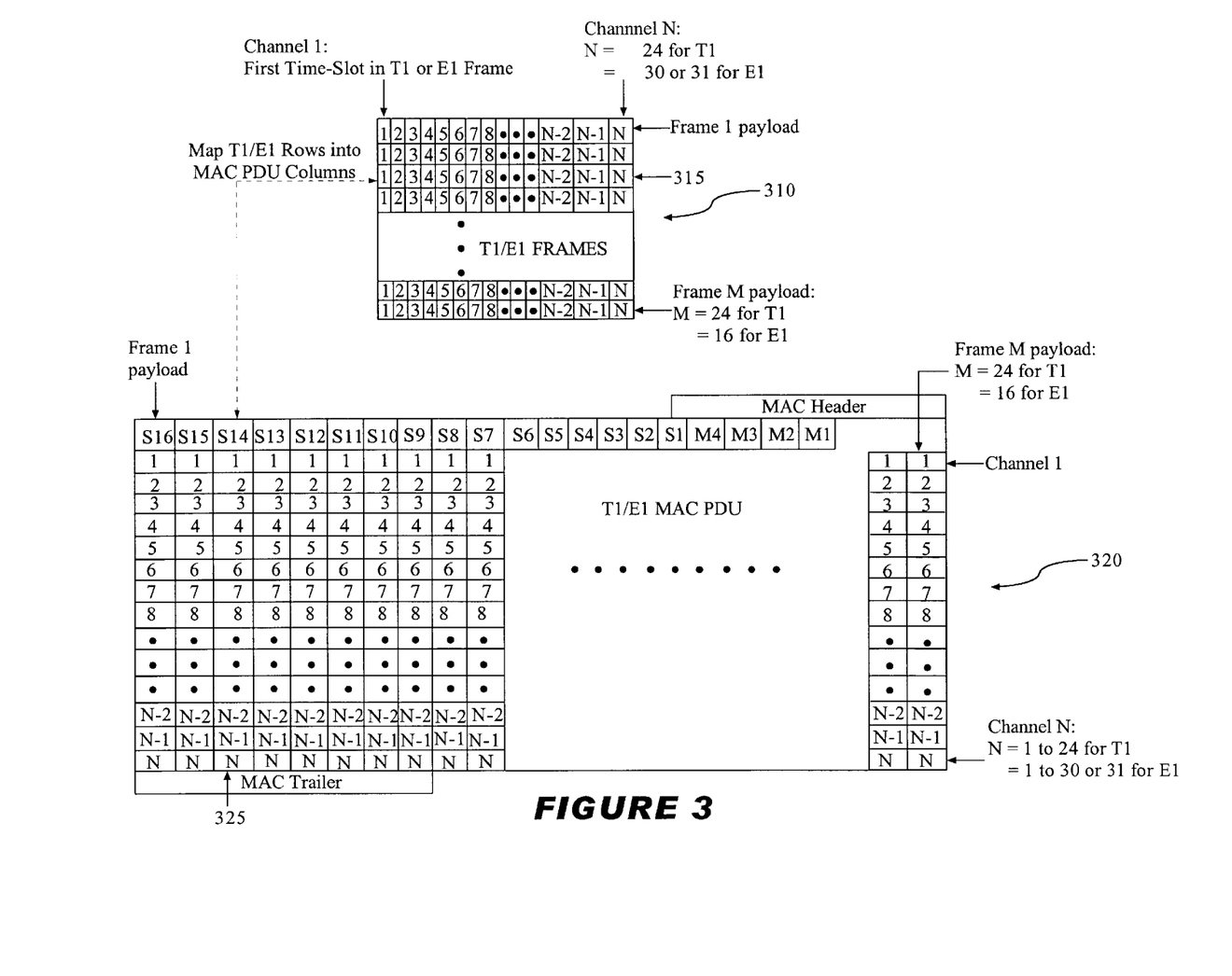
FIG. 3 is an illustration of a matrix for a T1/E1 superframe, a matrix for a T1/E1 MAC PDU superframe, and the mapping of T1/E1 frames for each superframe.

With continuing reference to FIG. 2 and additional reference to FIG. 3, the communication traffic received by a remote station 115 in FIG. 2 from a subscriber via a T1/E1 interface 201 is formatted as shown in the T1/E1 superframe 310 of FIG. 3. As indicated in the drawing, the T1/E1 superframe 310 is comprised of M rows of T1/E1 frames where M=24 for T1 frames and M=16 for E1 frames, and N columns of channels where N=24 for T1 frames and N=30 or 31 for E1 frames. The channels can also be referred to as time slots or subscribers. At the remote station, the communication traffic is reformatted into the T1/E1 MAC PDU superframe 320 ("MAC PDU", Media Access Control Protocol Data Unit). The MAC PDU is comprised of M columns of T1/E1 frames and up to N rows of channels, where M and N are defined above. The MAC PDU also includes a MAC Header, a MAC Trailer, 16 bytes of signaling information, S1 through S16, and 4 bytes of channel activity information, M1 through M4, all oriented in the MAC PDU as shown in FIG. 3. The MAC header and MAC trailer contain typical header/trailer information as is known in the art and play no role in the present invention. The MAC header and MAC trailer will not be discussed further.

The MAC PDU 320 supports 64 KHz, 32 KHz, 16 KHz, and 8 KHz voice compression. Therefore, the columns in the MAC PDU 320 will be 8, 4, 2, or 1 bit wide, respectively. In one preferred embodiment, the MAC PDU shall not contain framing bits and the MAC PDU will start on frame boundaries and frame alignment shall be maintained across the air link channel 203 between the base station 110 and a remote station 115. In a preferred embodiment, the MAC PDU will not be required to maintain superframe boundaries and superframe alignment shall not be maintained across the air link channel 203 between the base station 110 and a remote station 115.

For example, the remote station 115 receives the T1/E1 superframe 310 which includes the frame 315. The remote station builds the MAC PDU 320 and maps the payload of the frame 315 from the T1/E1 superframe row to the frame 325 column in the MAC PDU. The frame 325 column does not include the signaling byte S14 nor the MAC Trailer.

Each of the T1/E1 frame channels that carry information that requires signaling, such as voice information, have Channel Associated Signaling Bits, also known as ABCD Bits, included within the T1/E1 frame structure as is well known in the art. When the T1/E1 frames are received at the remote station 115 via a T1/E1 cable 201, the ABCD Bits are extracted from the T1/E1 frame and transported in the separate signaling bytes S1 through S16 in the MAC PDU, as will be described below.

Figure 4:
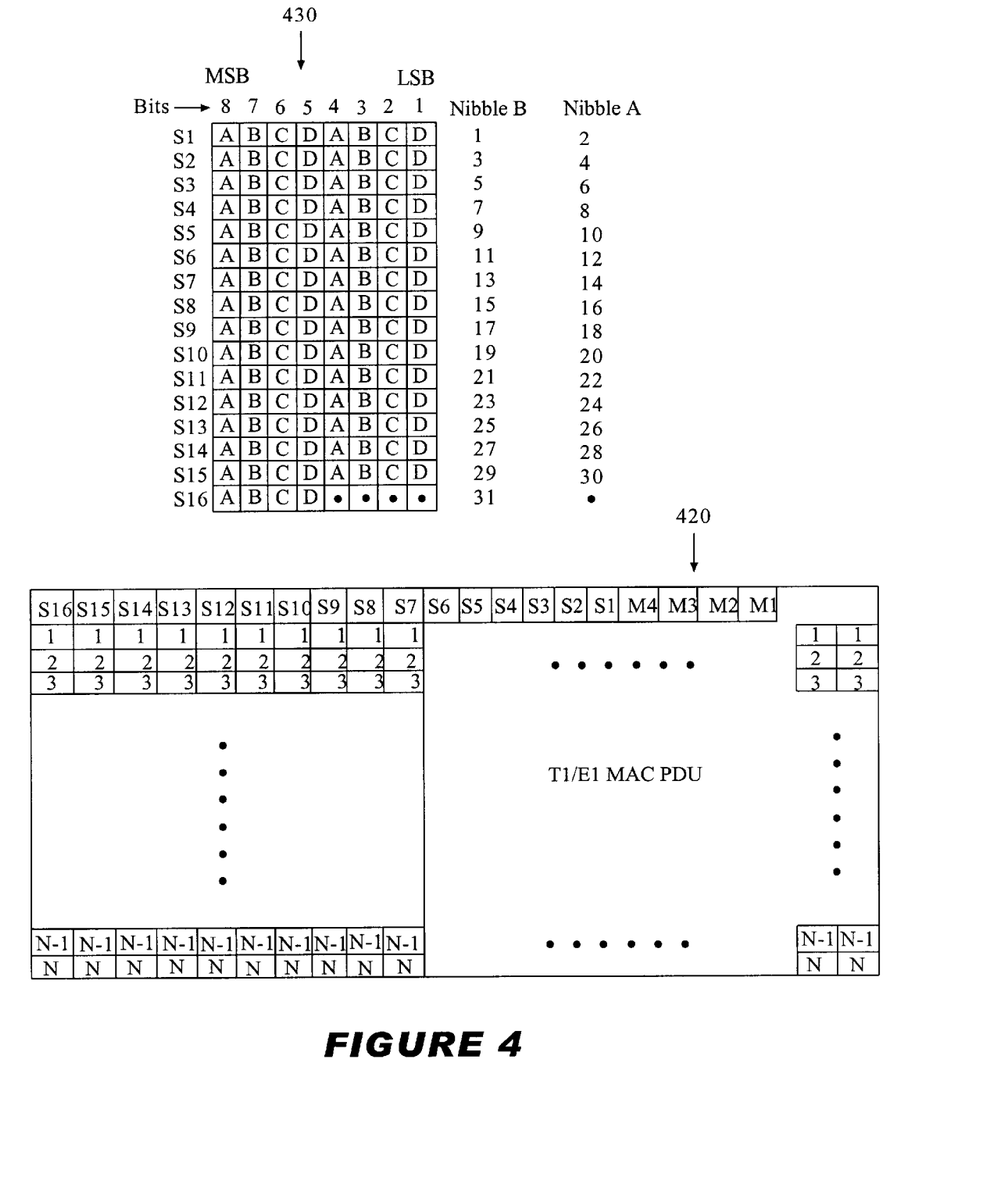
FIG. 4 is an illustration of part of the T1/E1 MAC PDU superframe showing an expanded detailed view of the signaling bytes S1 through S16.

Turning now to FIG. 4, a MAC PDU 420 is depicted as well as a detailed matrix 430 of the signaling bytes SI through S16. The MAC PDU 420 is similar to the MAC PDU 320 depicted in FIG. 3 with the exception that the MAC Header and MAC Trailer are not shown in the MAC PDU 420. Each of the signaling bits S1 through S16 are available to carry the ABCD Bits of the associated T1/E1 channels. The matrix 430 in FIG. 4 depicts how the ABCD Bits are formatted in the signaling bytes S1 through S16 of the MAC PDU. Each signaling byte is comprised of two nibbles, Nibble A and Nibble B. For each signaling byte, Nibble A includes bits 1–4 and Nibble B includes bits 5–8. Since there are 16 signaling bytes and there are 2 Nibbles/byte, this results in 32 Nibbles, numbered as shown in FIG. 4. For T1 communication traffic, there are 24 channels each with ABCD Bits for signaling information. The ABCD Bits are removed from the T1 frame, as discussed above, and placed in the appropriate Nibbles in the MAC PDU. For example, the ABCD Bits for T1 frame channel 15 would be placed in Nibble B of signaling byte S8 of the MAC PDU, which are bits 5–8 of signaling byte S8. Since T1 communication traffic consists of up to 24 channels, signaling bytes S13 through S16 would not be used. Similarly, for E1 communication traffic consisting of 31 channels, the ABCD Bits are removed from the E1 frame and placed in the appropriate Nibbles in the MIAC PDU. For example, the ABCD Bits for E1 frame channel 28 would be placed in Nibble A of signaling byte S14 of the MAC PDU, which are bits 1–4 of signaling byte S14.

According to a preferred embodiment of the present invention, all the ABCD Bits for each of the T1/E1 channels are extracted from the T1/E1 frame and placed in the appropriate nibble of the signaling bytes S1 through S16 regardless of whether the T1/E1 channel is carrying information that requires signaling (e.g., voice information) or information that does not require signaling (e.g., video, wideband audio, IP, etc.). In other words, the MAC PDU carries the signaling information for each T1/E1 channel independent of the type of data in the payload of the T1/E1 channel. Since signaling is not defined for information such as video, wideband audio, IP, etc., default values can be added to fill the appropriate S1 through S16 bytes for channels carrying information that does not require signaling. In another embodiment, the S1 through S16 bytes for channels that carrying information that does not require signaling can be filled with user-defined information for a variety of purposes, including, but not limited to, identifying the channel as not requiring signaling or communicating other traffic-related or signal-related information.

In one preferred embodiment, the remote station 115 extracts the T1/E1 ABCD Bits and places the T1/E1 ABCD Bits in the appropriate MAC PDU signaling bytes as discussed above, maps the payload of the T1/E1 frames into the MAC PDU as discussed above, and transmits the MAC PDU to the base station 110. In another preferred embodiment, the remote station 115 may monitor the ABCD Bits and include in the MAC PDU a request for bandwidth for those channels whose associated ABCD Bits indicate an active voice channel. Or, in certain circumstances, the remote station 115 may assign bandwidth to the active voice channels. According to a preferred embodiment of the present invention, only the base station 110 assigns bandwidth since only the base station is aware of the bandwidth requirements of all the nodes to which it is in communication. If a remote station were to be aware of all the bandwidth requirements of the base station to which it is communicating, for instance if only one remote station is in communication with a base station or the base station were to transmit its total bandwidth requirement to a remote station, then the remote station would be able to assign bandwidth. Such circumstances are contemplated by the present invention in which case the following discussion would also apply to the remote station.

Figure 5:
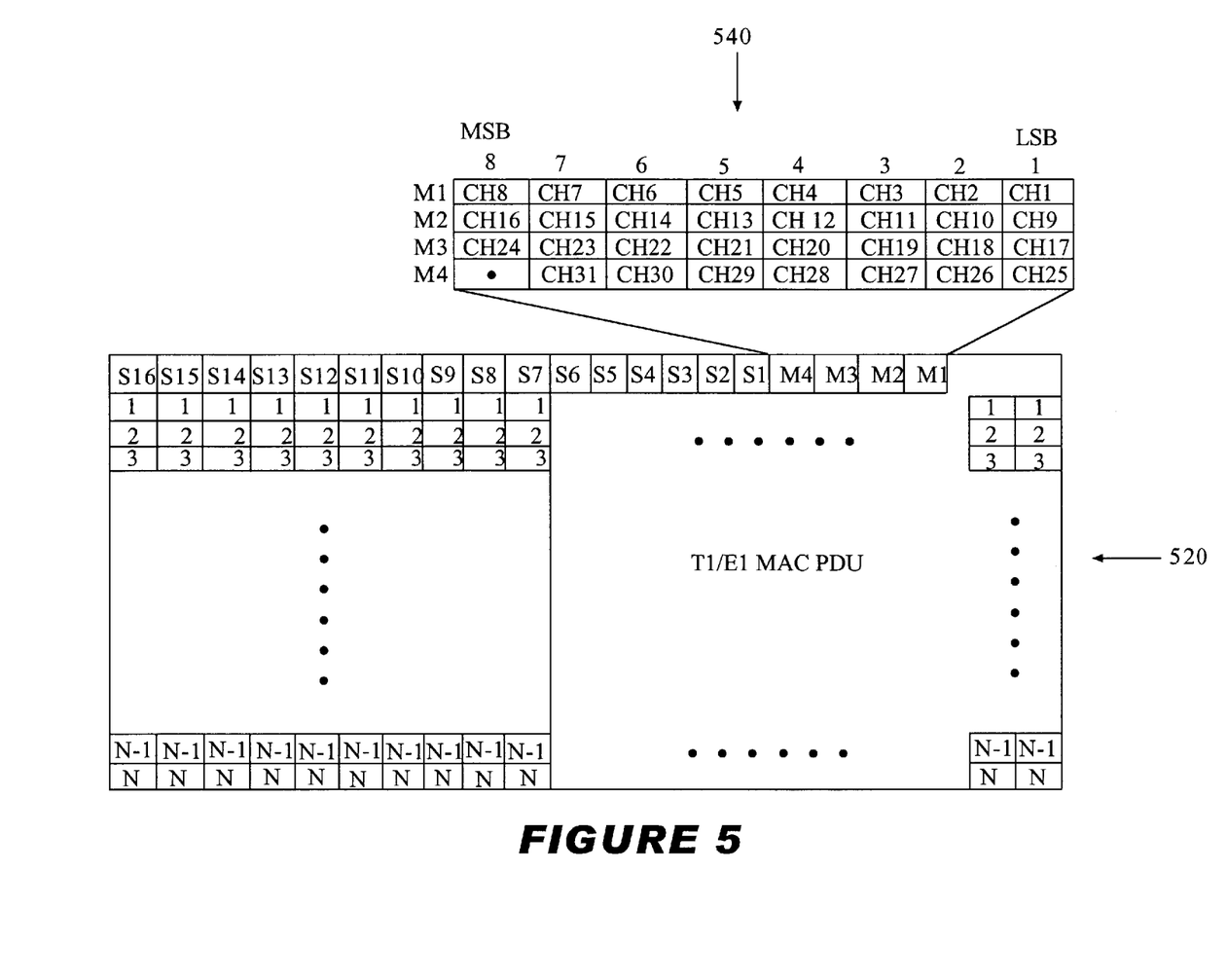
FIG. 5 is an illustration of part of the MAC PDU superframe showing an expanded detailed view of the activity bytes M1 through M4.

With reference now to FIG. 5, a MAC PDU 520 is depicted which is similar to the MAC PDU 420 of FIG. 4. Also depicted is the detailed matrix 540 of the activity bytes M1 through M4. Each activity byte M1 through M4 contains eight bits, where each bit is representative of the activity of an T1/E1 voice channel: channels 1–8 in byte M1, channels 9–16 in byte M2, channels 17–24 in byte M3, and channels 25–31 in byte M4. The most significant bit of byte M4 is not used since there is a maximum of 31 channels in an E1 system. For a T1 system, none of the bits in byte M4 would be used since a T1 system has a maximum of 24 channels.

Upon receipt of the MAC PDU by the base station 110 from a remote station 115 via an air link 203, the base station monitors the signaling bytes S1 through S16 of matrix 430 in FIG. 4 and sets the ACTIVE/IDLE bits in the activity bytes M1 through M4 of matrix 540 in FIG. 5 in response to the ABCD Bits in the signaling bytes S1 through S16 of matrix 430. The base station sets the bits in M1 through M4 to a "1" (one) for those channels that are active voice channels and sets the bits in M1 through M4 to a "0" (zero) for those channels that are idle voice channels. In a preferred embodiment, the base station also dynamically assigns bandwidth only to the active voice channels in both directions, i.e., from base station to remote station and from remote station to base station. In another embodiment, the base station may either dynamically assign bandwidth or the allocation of bandwidth may be fixed for each channel regardless of the ACTIVE/IDLE status of the channel. The network in which the base station 110 and the remote station 115 operate may be configurable such that the allocation of bandwidth in either a fixed or dynamic mode can be controlled by a standard configuration message, such as an SNMP (Simple Network Management Protocol) message.

Similarly, the base station 110 can receive a T1/E1 superframe 310 from a subscriber via the T1/E1 cable 202, extract the ABCD bits from the T1/E1 frame, populate the signaling byte matrix 430, all in a manner similar to the description above for the remote station, monitor the signaling bytes and set the activity bytes M1 through M4 of matrix 540 as described in the immediately preceding paragraph.

Figure 6:
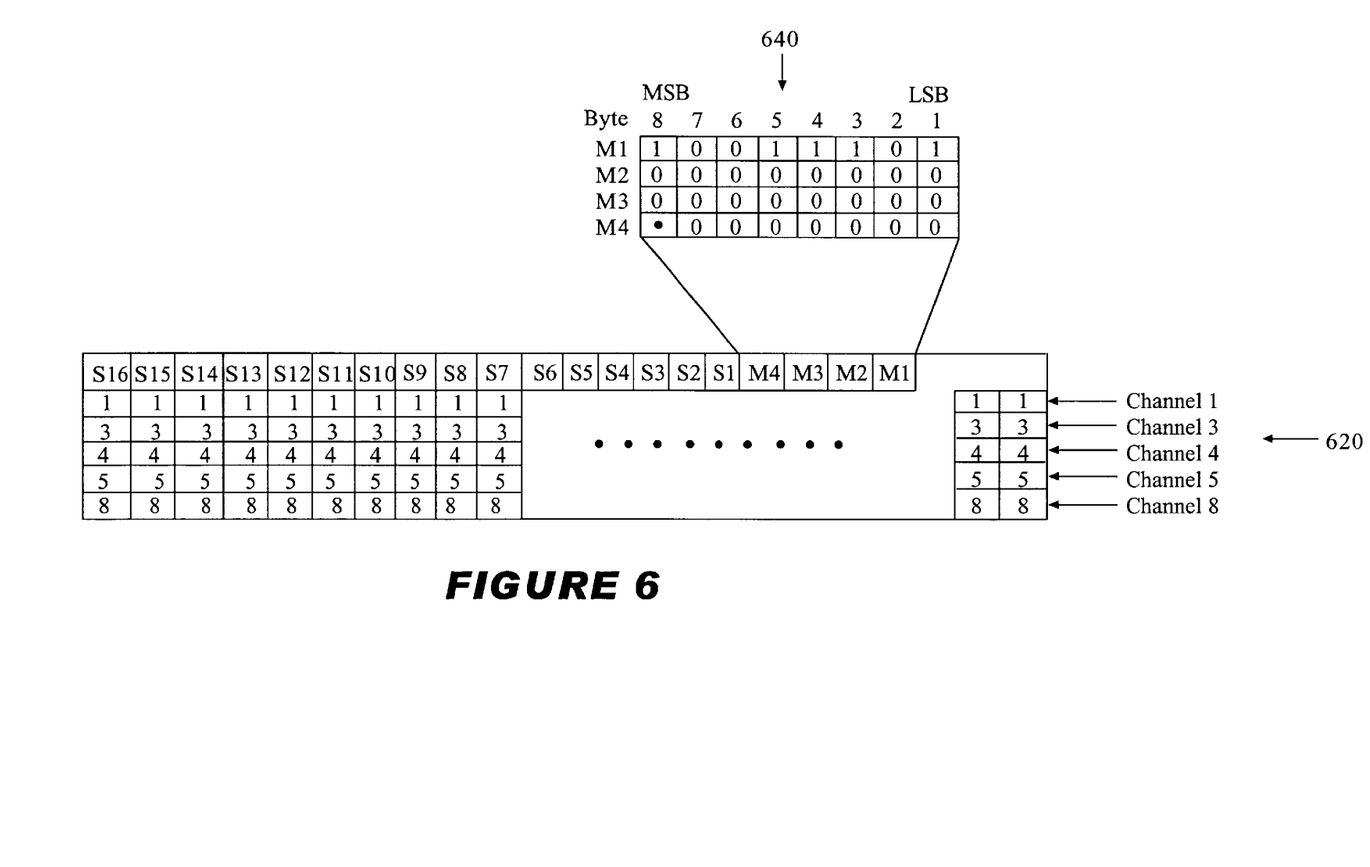
FIG. 6 is depicts a specific example of the MAC PDU superframe based on the values of the bits in the activity bytes M1 through M4.

As an example of the operation of the system, attention is now directed to FIG. 6 which depicts a MAC PDU 620 populated only with active voice channels and the activity bit matrix 640 showing the values of the activity bits of activity bytes M1 through M4. The base station 110 has monitored the ABCD bits in signaling bytes S1 through S16 and based on those bits, has set the activity bits in M1 through M4 to either a 1 or a 0. In this example, channels 1, 3, 4, 5, and 8 are ACTIVE and all other channels are IDLE. Note that the MAC PDU only contains the five active channels and none of the inactive channels, thereby greatly reducing the number of channels (24 channels for T1 and 30 or 31 channels for E1) that would otherwise have to be transmitted between the node and the base station.

The base station 110 transmits the MAC PDU via the air link 203 to the appropriate remote station 115 in order to complete the virtual circuit for the subscriber.

The assignment of bandwidth by the base station can occur dynamically based upon the status of the ABCD Bits in the T1/E1 channels. As discussed above, the base station can continuously monitor the ABCD Bits, monitor the bits periodically, or at random intervals. In a preferred embodiment, the base station would monitor the ABCD Bits continuously in order to detect a change in state of a channel from ACTIVE to IDLE or from IDLE to ACTIVE.

Figure 7:
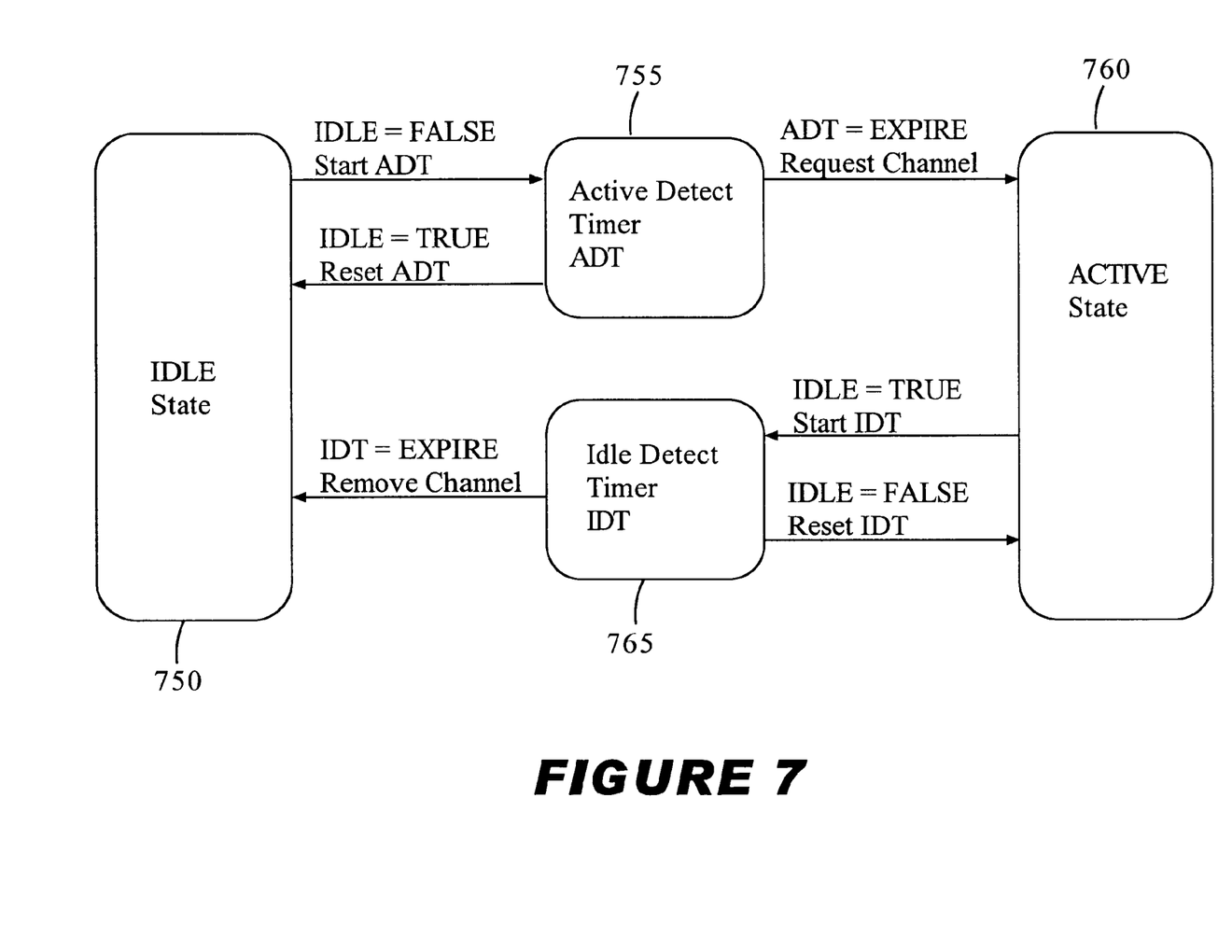
FIG. 7 is a functional block diagram depicting the changes of states of a channel between IDLE and ACTIVE.

With reference now to FIG. 7, a functional block diagram showing the transition between ACTIVE and IDLE states for a channel is depicted. When the base station detects a change in state of a channel by monitoring the ABCD Bits, a timer at the base station is started and runs for a predetermined time interval. If the change in state of the channel persists for at least as long as the predetermined time interval, the base station will change the value of the activity bit for that channel in the appropriate activity byte M1 through M4 and either assign or remove bandwidth for that channel depending on whether the channel is now ACTIVE or IDLE, respectively. If the change in state of the channel does not persist for the predetermined time interval, the state of the channel is not changed, the base station does not change the associated activity bit in M1 through M4 and the bandwidth allocation for the channel is not changed.

As an example, suppose a channel is in the IDLE state 750 of FIG. 7. If the base station detects an ACTIVE condition on the channel (IDLE=FALSE), as indicated by the ABCD Bits for that channel, the base station initiates the Active Detect Timer 755 ("ADT") which is set for a predetermined time interval $t_{AD}$. If the ACTIVE condition on the channel persists for at least as long as $t_{AD}$, i.e., the timer expires while the channel is still in an ACTIVE condition (ADT= EXPIRE), the base station sets the activity bit to ACTIVE placing the channel in the ACTIVE state 760 and the base station assigns bandwidth to the channel consistent with the discussion above. If the ACTIVE condition on the channel does not persist for as long as $t_{AD}$, e.g., the ACTIVE condition was spurious (IDLE=TRUE) the ADT is reset and the channel remains in the IDLE state 750.

Similarly, if a channel is initially in the ACTIVE state 760 and the base station detects an IDLE condition on the channel (IDLE=TRUE), as indicated by the ABCD Bits for that channel, the base station initiates the Idle Detect Timer 765 ("IDT") which is set for a predetermined time interval $t_{ID}$. If the IDLE condition on the channel persists for at least as long as $t_{ID}$, i.e., the timer expires while the channel is still in an IDLE condition (IDT=EXPIRE), the base station sets the activity bit to IDLE placing the channel in the IDLE state 760 and the base station removes bandwidth from the channel consistent with the discussion above. If the IDLE condition on the channel does not persist for as long as $t_{ID}$, e.g., the IDLE condition was spurious (IDLE=FALSE) the IDT is reset and the channel remains in the IDLE state 750.

In a preferred embodiment, the duration of the ADT, $t_{AD}$, is in the range of 10–500 milliseconds (msec) and the duration of the IDT, $t_{ID}$, is in the range of 1500–3000 msec. Preferentially, $t_{AD}$=20 msec and $t_{ID}$=1500 msec, although these values may change depending on a number of factors such as the type of traffic being sent through the channels, the number and duration of spurious ACTIVE and IDLE signals expected to be received by the base station, and the volume of traffic.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method of assigning bandwidth to at least one communication channel in a configurable multi-channel communication system having a wireless transmission interface including at least one remote station and a base station, comprising the steps of:

providing said base station;

providing a remote station in wireless communication with said base station whereby said remote station is adapted to receive communication traffic via a cable;

receiving communication traffic via said cable at said remote station whereby the communication traffic comprises a plurality of communication channels each having at least one active/idle bit indicating the status of the channel;

dynamically monitoring at said remote station the active/idle bit for at least one of said plural communication channels;

transmitting a request for bandwidth from said remote station to said base station in response to the active/idle bit for said at least one communication channel; and dynamically assigning bandwidth at the base station for said at least one communication channel.

2. The method of assigning bandwidth of claim 1 wherein said plural communication channels include at least one voice channel.

3. The method of assigning bandwidth of claim 2 wherein said channel status is ACTIVE.

4. The method of assigning bandwidth of claim 3 wherein said voice communication channels carry traffic configured in a T1 frame format.

5. The method of assigning bandwidth of claim 3 wherein said voice communication channels carry traffic configured in an E1 frame format.

6. The method of assigning bandwidth of claim 1 wherein the step of dynamically assigning bandwidth at said base station additionally includes selectively assigning bandwidth in response to a previously-received configuration bit.

7. A method of assigning bandwidth to at least one communication channel in a configurable multi-channel communication system having a wireless transmission interface including at least one remote station and a base station, comprising the steps of:

providing a remote station;

providing said base station in wireless communication with said remote station whereby said base station is adapted to receive communication traffic via a cable;

receiving communication traffic via said cable at said base station whereby the communication traffic comprises a plurality of communication channels each having at least one active/idle bit indicating the status of the channel;

dynamically monitoring at said base station the active/idle bit for at least one of said plural communication channels; and dynamically assigning bandwidth at the base station for said at least one communication channel.

8. The method of assigning bandwidth of claim 7 wherein said plural communication channels include at least one voice channel.

9. The method of assigning bandwidth of claim 8 wherein said channel status is ACTIVE.

10. The method of assigning bandwidth of claim 9 wherein said voice communication channels carry traffic configured in a T1 frame format.

11. The method of assigning bandwidth of claim 9 wherein said voice communication channels carry traffic configured in an E1 frame format.

12. The method of assigning bandwidth of claim 7 wherein the step of dynamically assigning bandwidth at said base station additionally includes selectively assigning bandwidth in response to a previously-received configuration bit.

13. In a method for transmitting communication signals in a predetermined frame format in a multichannel configurable wireless communication system where the communication signals include an information bit the value of which is representative of the presence of communication signals in one channel; the improvement wherein bandwidth is selectively assigned to said one channel in response to the value of said information bit and a previously-received configuration message.

14. The method of claim 13 wherein at least one of said multiple channels requires signaling.

15. The method of claim 14 wherein bandwidth is dynamically not assigned to a channel that requires signaling wherein the value of said information bit indicates the absence of communication signals in said channel.

16. The method of claim 13 wherein said predetermined frame format is a T1 frame format.

17. The method of claim 13 wherein said predetermined frame format is an E1 frame format.

18. The method of claim 13 wherein said configuration message defines the structure of a protocol data unit.

19. A method of dynamically assigning bandwidth for a plurality of communication channels in a digital communication system comprising the steps of:

receiving digital information including a signaling byte for each of a plurality of communication channels;

providing a protocol data unit capable of carrying said digital information from said plurality of communication channels;

monitoring the information in select ones of said signaling bytes;

modifying said protocol data unit as a function of the information in said select signaling bytes;

assigning bandwidth for said plurality of communication channels as a function of the modified protocol data unit.

20. The method of claim 19 wherein said communication channels are DS0 channels.

21. The method of claim 19 wherein said digital communication system comprises a wireless link.

22. The method of claim 21 wherein said wireless link includes a base station and at least one remote station.

23. The method of claim 22 wherein the digital information is received at said base station.

24. The method of claim 22 wherein the digital information is received at one of said remote stations.

25. The method of claim 19 wherein said protocol data unit also includes plural activity bits indicating which of said plurality of communication channels are in an inactive state.

26. The method of claim 25 wherein the signaling byte associated with a one of the communication channels contain information indicating that the type of data being carried by said one communication channel is voice data.

27. The method or claim 26 wherein the step of assigning bandwidth as a function of the modified protocol unit includes refraining from assigning bandwidth to a one of said plurality of communication channels where the signaling byte for said one communication channel indicates that the type of data being carried is voice data and the activity bit for said one communication channel indicates that said one communication channel is in an inactive state.

28. A method of dynamically assigning bandwidth for a digital communication channel in an N channel communication system in which the communication signal includes plural protocol data units each having N bi-state activity bits in predetermined positions within the protocol data unit, each of said activity bits indicating the state of one of the N communication channels, comprising the steps of:

monitoring one of the activity bits in successive protocol data units;

detecting a change in the state of the monitored activity bit;

modifying the structure of the protocol data unit associated with the monitored activity bit in the absence of a subsequent change in the state of the activity bit during a predetermined time interval initiated by the detection of the change of state of the monitored activity bit, to thereby vary the assignment of bandwidth to the channel associated with the monitored bit.

29. The method of claim 28 wherein the predetermined time interval is greater than the time interval between successive protocol data units.

30. The method of claim 28 where the predetermined time interval is an integer number of the interval between successive protocol data units.

31. The method of claim 28 where the change of state of the monitored activity bit indicates a change to an ACTIVE state.

32. The method of claim 28 wherein said communication channel is initially in an IDLE state and said predetermined time interval is in the range of 10 to 500 msec.

33. The method of claim 32 wherein the predetermined time interval is approximately 20 msec.

34. The method of claim 28 wherein said communication channel is initially in an ACTIVE state and said predetermined time interval is in the range of 1500 to 3000 msec.

35. The method of claim 34 wherein said predetermined time interval is approximately 1500 msec.

* * * * *